(12) United States Patent
Dodson et al.

(10) Patent No.: US 10,338,999 B2
(45) Date of Patent: Jul. 2, 2019

(54) CONFIRMING MEMORY MARKS INDICATING AN ERROR IN COMPUTER MEMORY

(71) Applicant: International Business Machines Corporation, Armonk, NY (US)

(72) Inventors: John S. Dodson, Austin, TX (US); Marc A. Gollub, Round Rock, TX (US); Warren E. Maule, Cedar Park, TX (US); Brad W. Michael, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/255,415

(22) Filed: Sep. 2, 2016

(65) Prior Publication Data

US 2018/0067806 A1 Mar. 8, 2018

(51) Int. Cl.
*G06F 11/10* (2006.01)
*G06F 3/06* (2006.01)

(52) U.S. Cl.
CPC ........ *G06F 11/1048* (2013.01); *G06F 3/0619* (2013.01); *G06F 3/0659* (2013.01); *G06F 3/0673* (2013.01); *G06F 11/1076* (2013.01)

(58) Field of Classification Search
None
See application file for complete search history.

(56) References Cited

U.S. PATENT DOCUMENTS

| | | | |
|---|---|---|---|
| 4,209,809 A | 6/1980 | Chang et al. | |
| 4,506,362 A | 3/1985 | Morley | |
| 4,577,240 A | 3/1986 | Hedberg et al. | |
| 4,939,694 A | 7/1990 | Eaton et al. | |
| 4,964,129 A | 10/1990 | Bowden, III et al. | |
| 4,964,130 A | 10/1990 | Bowden, III et al. | |
| 5,014,273 A | 5/1991 | Gagliardo et al. | |
| 5,390,309 A | 2/1995 | Onodera | |
| 5,644,539 A | 7/1997 | Yamagami et al. | |
| 5,872,905 A | 2/1999 | Ono et al. | |
| 8,352,806 B2 * | 1/2013 | Gollub | G06F 11/1048 714/54 |
| 8,484,529 B2 | 7/2013 | Alves et al. | |
| 8,650,437 B2 | 2/2014 | Fry et al. | |

(Continued)

OTHER PUBLICATIONS

Appendix P; List of IBM Patent or Applications Treated as Related, Dec. 2, 2016, 2 pages.

*Primary Examiner* — Justin R Knapp
(74) *Attorney, Agent, or Firm* — Nathan M. Rau (57) ABSTRACT

Confirming memory marks indicating an error in computer memory including detecting, by memory logic responsive to a memory read operation, an error in at a memory location; marking, by the memory logic in an entry in a hardware mark table, the memory location as containing the error, the entry including one or more parameters for correcting the error; and retrying, by the memory logic, the memory read operation, including: responsive to again detecting the error in the memory location, determining whether the error is correctable at the memory location using the parameters included in the entry; and if the error is correctable at the memory location using the one or more parameters included in the entry, confirming the error in the entry of the hardware mark table.

20 Claims, 6 Drawing Sheets

(56) References Cited

U.S. PATENT DOCUMENTS

| | | |
|---|---|---|
| 8,689,080 B2 | 4/2014 | Carman et al. |
| 8,862,953 B2 | 10/2014 | Gollub et al. |
| 9,092,361 B2 * | 7/2015 | Honda ................ G06F 11/1068 |
| 9,244,852 B2 * | 1/2016 | Prasad ................ G06F 12/0891 |
| 2002/0191319 A1 | 12/2002 | Liew et al. |
| 2003/0088805 A1 | 5/2003 | Majni et al. |
| 2004/0078700 A1 | 4/2004 | Jeong |
| 2006/0007801 A1 | 1/2006 | Takashima |
| 2008/0072118 A1 | 3/2008 | Brown et al. |
| 2009/0164727 A1 | 6/2009 | Penton et al. |
| 2009/0300425 A1 | 12/2009 | Gollub et al. |
| 2009/0313526 A1 | 12/2009 | Neuman |
| 2010/0037044 A1 | 2/2010 | Yang et al. |
| 2010/0287445 A1 | 11/2010 | Dell et al. |
| 2010/0293437 A1 | 11/2010 | Gollub et al. |
| 2011/0320911 A1 | 12/2011 | Fry et al. |
| 2011/0320914 A1 | 12/2011 | Alves et al. |
| 2012/0173936 A1 | 7/2012 | Johnson et al. |
| 2013/0007542 A1 | 1/2013 | Carman et al. |
| 2013/0326293 A1 | 12/2013 | Muralimanohar et al. |
| 2014/0026011 A1 | 1/2014 | Huang et al. |
| 2014/0195867 A1 | 7/2014 | Gollub et al. |
| 2014/0223239 A1 | 8/2014 | Mittal et al. |
| 2015/0089280 A1 | 3/2015 | Sade et al. |
| 2016/0132259 A1 | 5/2016 | Dell et al. |
| 2016/0239228 A1 * | 8/2016 | Bennett ................ G06F 12/00 |
| 2018/0067719 A1 | 3/2018 | Dodson et al. |
| 2018/0067798 A1 | 3/2018 | Dodson et al. |
| 2018/0068741 A1 | 3/2018 | Dodson et al. |

\* cited by examiner

CONFIRMING MEMORY MARKS INDICATING AN ERROR IN COMPUTER MEMORY

BACKGROUND

Field of the Invention

The field of the invention is data processing, or, more specifically, methods, apparatus, and products for confirming memory marks indicating an error in computer memory.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for confirming memory marks indicating an error in computer memory are disclosed in this specification. Confirming memory marks indicating an error in computer memory includes detecting, by memory logic responsive to a memory read operation, an error in at a memory location; marking, by the memory logic in an entry in a hardware mark table, the memory location as containing the error, the entry including one or more parameters for correcting the error; and retrying, by the memory logic, the memory read operation, including: responsive to again detecting the error in the memory location, determining whether the error is correctable at the memory location using the parameters included in the entry; and if the error is correctable at the memory location using the one or more parameters included in the entry, confirming the error in the entry of the hardware mark table.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
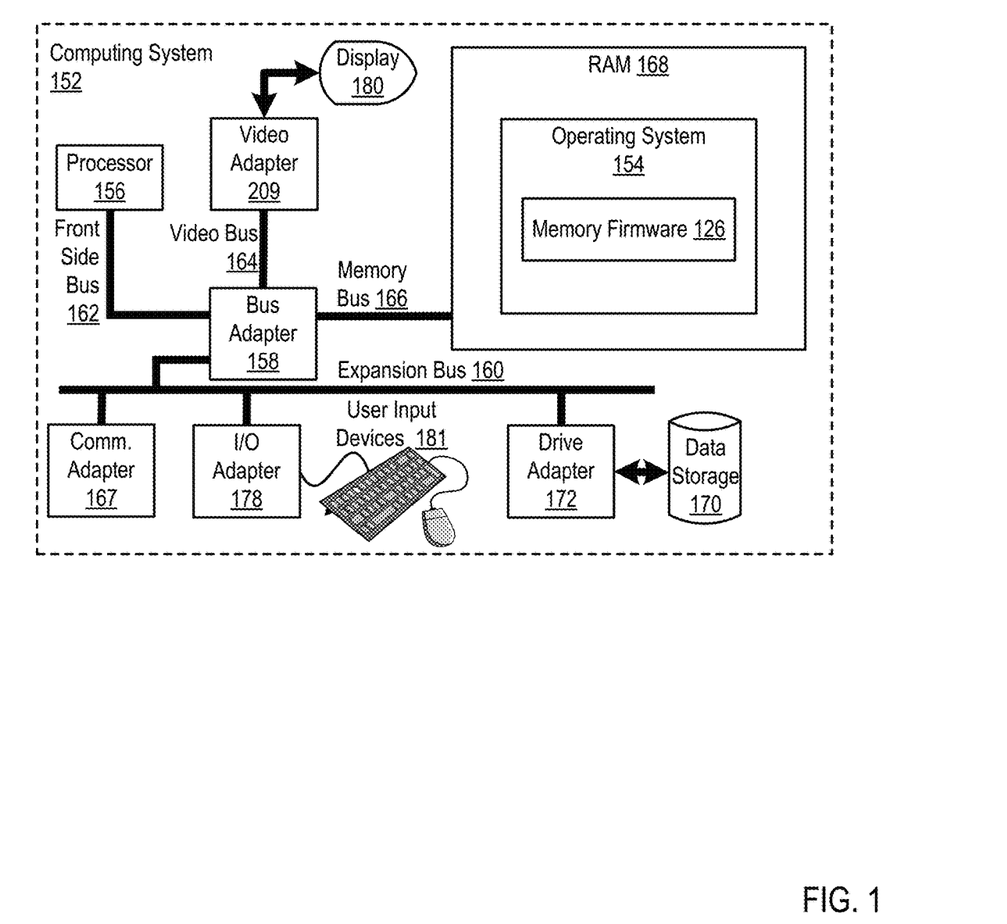
FIG. 1 sets forth a block diagram of an example system configured for confirming memory marks indicating an error in computer memory according to embodiments of the present invention.

Exemplary methods, apparatus, and products for confirming memory marks indicating an error in computer memory in accordance with the present invention are described with reference to the accompanying drawings, beginning with FIG. 1. FIG. 1 sets forth a block diagram of automated computing machinery comprising an exemplary computing system (152) configured for confirming memory marks indicating an error in computer memory according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for confirming memory marks indicating an error in computer memory according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and part of the operating system is the memory firmware (126), a module of computer program instructions useful for confirming memory marks indicating an error in computer memory.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for confirming memory marks indicating an error in computer memory according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for confirming memory marks indicating an error in computer memory according to embodiments of the present invention include modems for wired dial-up communications, Ethernet (IEEE 802.3) adapters for wired data communications, and 802.11 adapters for wireless data communications.

Figure 2:
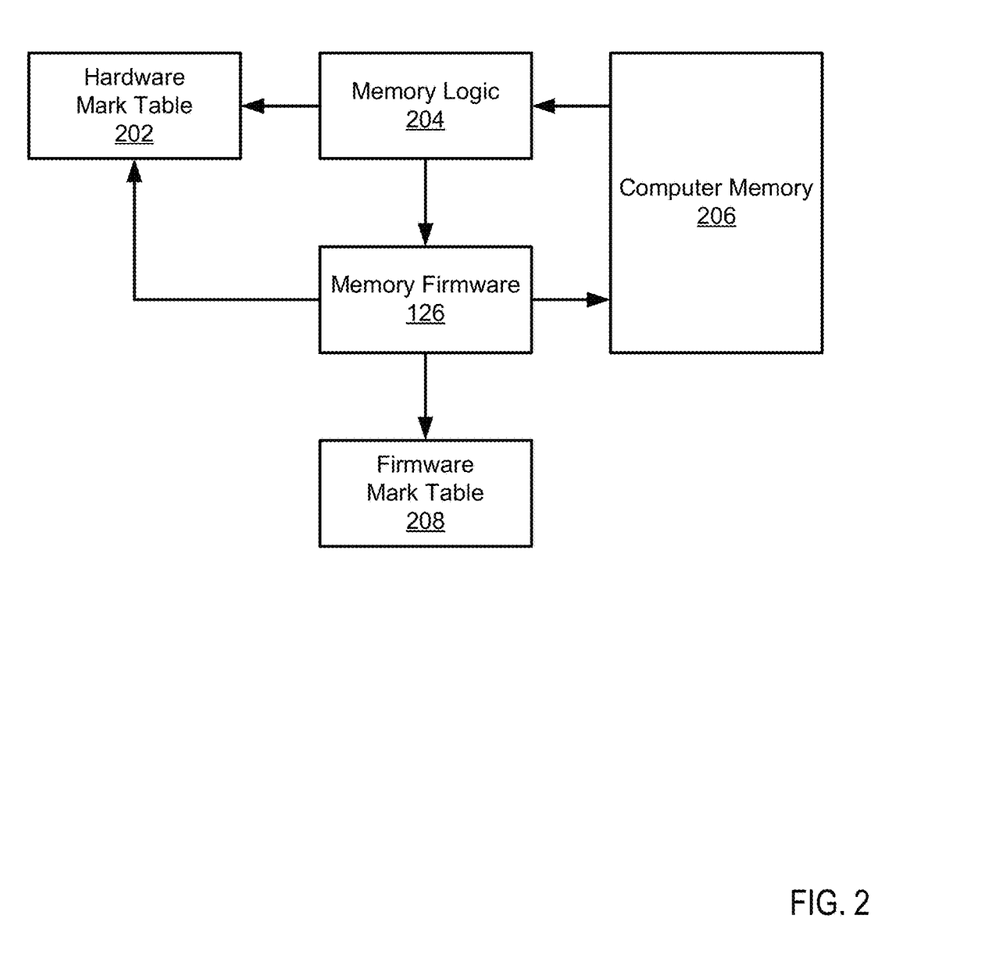
FIG. 2 sets forth a block diagram for confirming memory marks indicating an error in computer memory according to embodiments of the present invention.

FIG. 2 is an example block diagram of a system configured for confirming memory marks indicating an error in computer memory. FIG. 2 includes a hardware mark table (202), memory logic (204), computer memory (206) (such as RAM (168)), memory firmware (126), and a firmware mark table (208).

The error correction code (ECC) system uses two types of marks that correspond to different sets of bit error locations. Symbol marks indicate errors expected in one or more bits associated with a particular DRAM data bit. Such errors may be caused, for example, by a faulty DRAM data I/O pin or by a DRAM internal failure which affects only bits within the set. Chip marks indicate errors expected in one or more bits associated with a particular DRAM chip. Such errors may be caused, for example, by multiple faulty DRAM data I/O pins, a faulty dram address or control I/O pin, or a DRAM internal failure which affects a larger portion of data than would be covered by a symbol mark. A chip mark is equivalent to a set of symbol marks covering all data from one DRAM chip.

The hardware mark table (202) is a data structure architected in hardware with fields that may be altered. The hardware mark table (202) may be a part of the computer memory (206) hardware, the CPU hardware, or another hardware structure within the computing system. The hardware mark table (202) is configured to store information about detected errors within the computer memory (206) including one or more parameters for correcting an error.

The one or more parameters for correcting an error may include a chip mark (indicating that one of the bits within a set of bits may be unreliable) and/or a symbol mark (indicating that the error is at a specific bit within a region). The one or more parameters for correcting an error may include information about the location of the error, such as the region (e.g., a rank) in which the error has occurred. The hardware mark table (202) may be limited in that the hardware mark table may only be able to store one type of error indication (e.g., a chip mark) and be unable to store a second error indication (e.g., a symbol mark) or indicate that the error applies to a broader or narrower set of elements within the computer memory (206) (e.g., a dual in-line memory module (DIMM), a group of banks, or a bank).

Each entry in the hardware mark table (202) may also include a field indicating whether the error has been confirmed. For example, entries in the hardware mark table (202) may include an element (e.g., a bit) that is augmented to indicate whether the read instruction associated with the error has been retried and the outcome of the retry. Upon initial detection of the error and creation of the entry, the element may indicate that the read instruction has not been retried (e.g., by setting the bit 'down' or '0'). Once the error has been retried and again detected, the element may be augmented to indicate that the error remains (e.g., by setting the bit 'up' or '1').

The memory logic (204) is a collection of programs within hardware, software, or firmware that detects errors within the computer memory (206) and reports those errors using the hardware mark table (202). The memory logic (204) may be limited in the types and applicability of the errors the memory logic (204) is able to report. For example, the memory logic (204) may only be able to detect one type of error in one region (e.g., at least one unreliable 4 bit word within a rank).

The computer memory (206) is a group of bit storage devices used to store data for a computing system. The computer memory (206) may include a hierarchy of components. For example, each bit storage device may be a capacitor, and the capacitors may be grouped in banks. The banks may be grouped in bank groups, a set of bank groups may be organized into a rank, and a set of ranks may be organized into a DIMM.

The memory firmware (126) is a collection of programs within the computing system used to facilitate interoperability between the software components on the computing system and the memory hardware. The memory firmware (126) may be part of an operating system or hypervisor executing on the computing system. The memory firmware (126) may further include functionality to initiate a scan of the computer memory using, for example, a scrub engine that scans a region of the computer memory (206) to obtain information about the error, such as the type of error and the range of memory addresses affected by the error. The memory firmware (126) may then store the information in the firmware mark table (208).

The firmware mark table (208) is a mark table used by the memory firmware (126) to store information about detected errors in the computer memory (206). The firmware mark table (208) may store more information about detected errors then may be stored in the hardware mark table (202). Each entry in the firmware mark table (208) may include a match address, a region size, and a mark location for each error detected by the memory firmware (126). Although FIG. 2 shows the hardware mark table (202) and the firmware mark table (208) as separately implemented tables, the hardware mark table (202) and the firmware mark table (208) may be implemented as a single table (e.g., a single firmware mark table).

The firmware mark table (208) may be stored in content-addressable memory (CAM) such that the contents may be retrieved using a CAM lookup. The firmware mark table (208) may be configured such that entries may be retrieved by matching a memory address to a match address of an entry in the firmware mark table (208). A matching entry may also incorporate the region size to determine a match. Specifically, a match may be a hit if the given memory address is within the same specified region as the match address.

Figure 3:
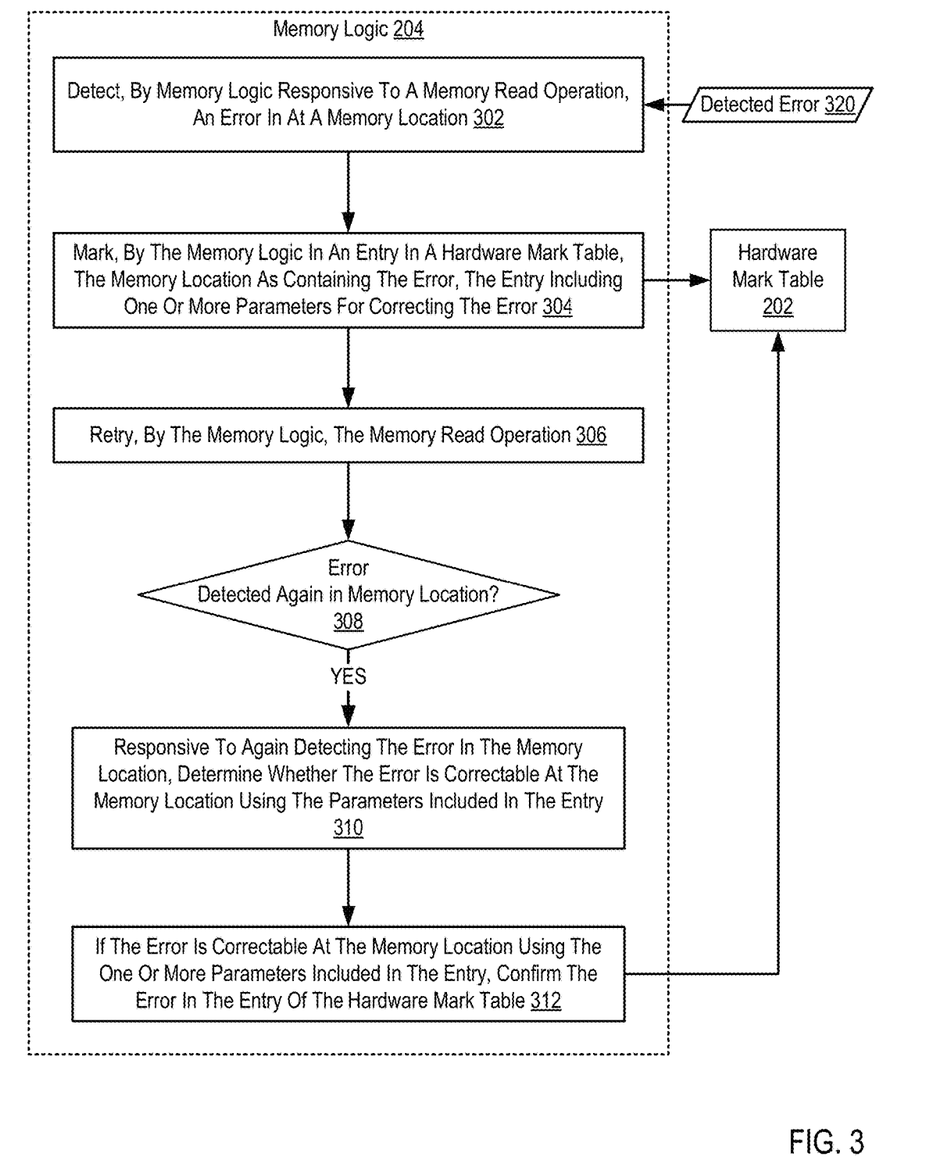
FIG. 3 sets forth a flow chart illustrating an exemplary method for confirming memory marks indicating an error in computer memory according to embodiments of the present invention.

For further explanation, FIG. 3 sets forth a flow chart illustrating an exemplary method for confirming memory marks indicating an error in computer memory according to embodiments of the present invention. The method of FIG. 3 includes detecting (302), by memory logic responsive to a memory read operation, an error (320) in at a memory location. Detecting (302), by memory logic responsive to a memory read operation, an error (320) in at a memory location may be carried out by executing a read operation sent by an application, the operating system, or other element within the computing system. During the execution of the memory read operation, some data may not be retrievable or the retrieved data may not be consistent with an expected data size or data content. The detected error (320) in at a memory location may be a chip kill error (indicating that at least one memory location within a rank has an error), and may be referred to as a "chip mark" or "mark".

The method of FIG. 3 also includes marking (304), by the memory logic (204) in an entry in a hardware mark table (202), the memory location as containing the error, the entry including one or more parameters for correcting the error. Marking (304), by the memory logic in an entry in a hardware mark table (202), the memory location as containing the error, the entry including one or more parameters for correcting the error may be carried out by accessing the hardware mark table (202) and creating a new entry in the hardware mark table (202) for the detected error. Marking (304), by the memory logic in an entry in a hardware mark table (202), the memory location as containing the error, the entry including one or more parameters for correcting the error may be carried out by accessing an existing entry in the mark table (202), and storing information about the detected error in the entry.

Marking (304), by the memory logic in an entry in a hardware mark table (202), the memory location as containing the error, the entry including one or more parameters for correcting the error may be carried out by generating and storing, in the entry, the one or more parameters for correcting error. The one or more parameters for correcting error may include a mark location, a chip mark, a symbol mark, and/or information related to error correcting code useful for correcting the error.

The method of FIG. 3 also includes retrying (306), by the memory logic (204), the memory read operation. Retrying (306), by the memory logic, the memory read operation may be carried out by re-executing the same memory read operation in the same manner as the previous memory read operation that resulted in the initial error. Alternatively, retrying (306), by the memory logic, the memory read operation may be carried out by executing a modified memory read operation. Such a modified memory read operation may include additional monitoring and reporting of the memory read operation. The modified memory read operation may target a narrower range of memory addresses than the initial memory read operation. Further, the modified memory read operation may target only the memory address or addresses that resulted in the initially-detected error.

Upon retrying (306), by the memory logic, the memory read operation, one of three outcomes is expected. First, the error may no longer be detected upon retrying the memory read operation. Second, the error is again detected, and it is determined to be correctable. Third, the error is again detected, and is determined to be uncorrectable.

The method of FIG. 3 also includes determining (308) that the error has been detected again. Determining (308) that the error has been detected again may be carried out by encountering the same or similar error in response to executing the memory read operation a second time. Determining (308) that the error has been detected again may also be carried out by detecting results from the monitoring or reporting during the execution of the memory read operation a second time.

The method of FIG. 3 also includes, responsive to again detecting the error in the memory location, determining (310) whether the error is correctable at the memory location using the parameters included in the entry. Determining (310) whether the error is correctable at the memory location using the parameters included in the entry may be carried out by utilizing the parameters included in the entry to attempt to generate corrected data matching the previously stored data in the memory location. Attempting to generate the corrected data may also include utilizing error correcting code stored in the computer memory.

Determining (310) whether the error is correctable at the memory location using the parameters included in the entry may be carried out by determining whether the parameters and/or the error correcting code associated with the memory location are valid. If the parameters or error correcting code is invalid, then the error may be determined to be uncorrectable.

The method of FIG. 3 also includes, if the error is correctable at the memory location using the one or more parameters included in the entry, confirming (312) the error in the entry of the hardware mark table (202). Confirming (312) the error in the entry of the hardware mark table (202) may be carried out by augmenting a state element within the entry of the hardware mark table (202) indicating that the error is confirmed; and notifying memory firmware (126) that the error has been confirmed. Once the error is confirmed, the memory firmware (126) may identify a range of addresses affected by the error and store the information about the error and the region affected by the error in the firmware mark table.

For example, a memory read operation may be executed targeting a memory location in rank A. During the execution of the memory read operation, the memory logic (204) determines that the data read does not match an expected data read for the memory location, and that an error has occurred. The memory logic (204) generates an entry in the hardware mark table (202) for rank A, indicates in the entry that an error has occurred, stores parameters for correcting the error in the entry, and marks the error as unconfirmed. The memory logic (204) then retries the memory read operation on the memory location within rank A, and determines that the same error has occurred. The memory logic (204) then determines whether the error in rank A is correctable, and if so, corrects the error using the parameters stored in the entry. Finally, the memory logic indicates in the entry that the error in rank A has been confirmed.

Figure 4:
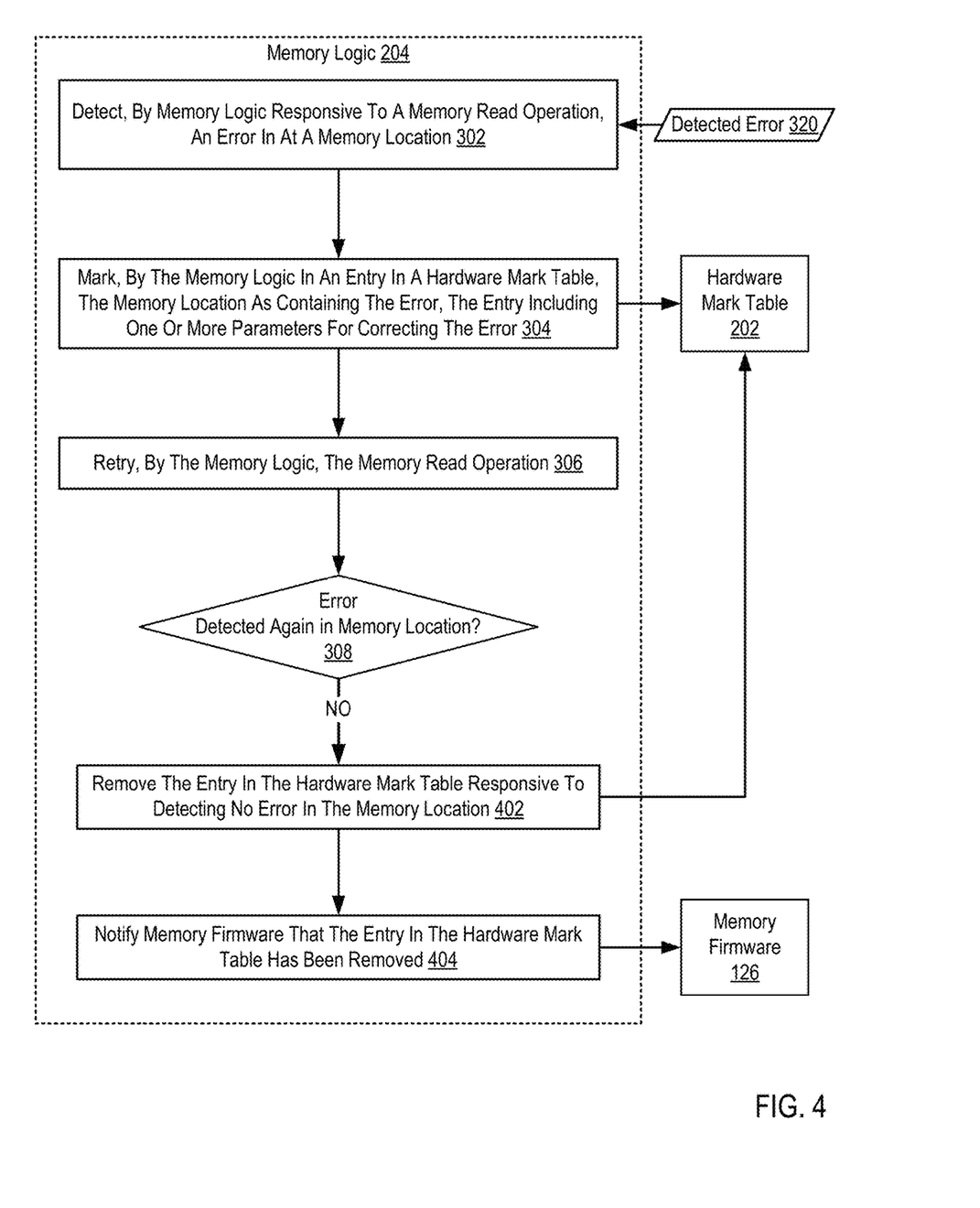
FIG. 4 sets forth a flow chart illustrating an exemplary method for confirming memory marks indicating an error in computer memory according to embodiments of the present invention.

For further explanation, FIG. 4 sets forth a flow chart illustrating an exemplary method for confirming memory marks indicating an error in computer memory according to embodiments of the present invention that includes detecting (302), by memory logic responsive to a memory read operation, an error (320) in at a memory location; marking (304), by the memory logic in an entry in a hardware mark table (202), the memory location as containing the error, the entry including one or more parameters for correcting the error; and retrying (306), by the memory logic, the memory read operation.

The method of FIG. 4 differs from the method of FIG. 3, however, in that the error (320) is not detected again in the memory location and includes removing (402) the entry in the hardware mark table (202) responsive to detecting no error in the memory location; and notifying (404) memory firmware (126) that the entry in the hardware mark table (202) has been removed.

Removing (402) the entry in the hardware mark table (202) responsive to detecting no error in the memory location may be carried out by setting a valid element in the entry to indicate that the entry is no longer valid. Removing (402) the entry in the hardware mark table (202) responsive to detecting no error in the memory location may also be carried out by altering the hardware mark table (202) to remove references to the entry.

Notifying (404) memory firmware (126) that the entry in the hardware mark table (202) has been removed may be carried out by transmitting, from the memory logic (204), a signal detectable by the memory firmware (126) that indicates that the error and associated entry were removed from the hardware mark table (202). The notification may include additional information about the removed error, such as the mark location and associated region (e.g., rank).

For example, a memory read operation may be executed targeting a memory location in rank B. During the execution of the memory read operation, the memory logic (204) determines that the data read does not match an expected data read for the memory location, and that an error has occurred. The memory logic (204) generates an entry in the hardware mark table (202) for rank B, indicates in the entry that an error has occurred, stores parameters for correcting the error in the entry, and marks the error as unconfirmed. The memory logic (204) then retries the memory read operation on the memory location within rank B, and determines that the same error has not occurred. The memory logic (204) then removes the entry in the hardware mark table (202) by setting a valid bit of the entry to 'invalid' or '0'. Finally, the memory logic (204) notifies the memory firmware (126) that an error in rank B was initially detected, but upon retry, the error did not occur.

Figure 5:
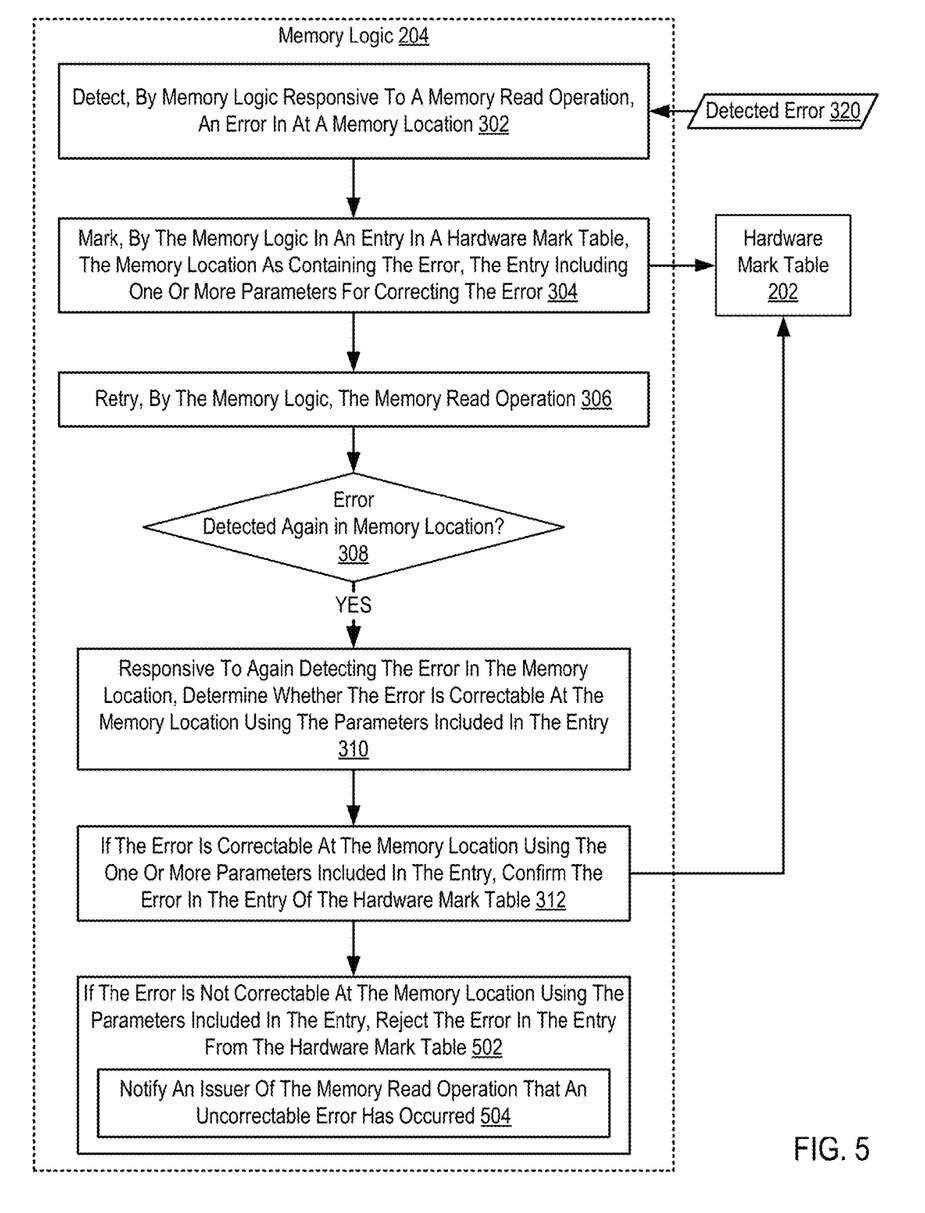
FIG. 5 sets forth a flow chart illustrating an exemplary method for confirming memory marks indicating an error in computer memory according to embodiments of the present invention.

For further explanation, FIG. 5 sets forth a flow chart illustrating an exemplary method for confirming memory marks indicating an error in computer memory according to embodiments of the present invention that includes detecting (302), by memory logic responsive to a memory read operation, an error (320) in at a memory location; marking (304), by the memory logic in an entry in a hardware mark table (202), the memory location as containing the error, the entry including one or more parameters for correcting the error; and retrying (306), by the memory logic, the memory read operation, including: determining (308) that the error has been detected again; responsive to again detecting the error in the memory location, determining (310) whether the error is correctable at the memory location using the parameters included in the entry; and if the error is correctable at the memory location using the one or more parameters included in the entry, confirming (312) the error in the entry of the hardware mark table (202).

The method of FIG. 5 differs from the method of FIG. 3, however, in that FIG. 5 further includes, if the error is not correctable at the memory location using the parameters included in the entry, rejecting (502) the error in the entry from the hardware mark table, including notifying (504) an issuer of the memory read operation that an uncorrectable error has occurred.

Rejecting (502) the error in the entry from the hardware mark table may be carried out by placing an indication in the entry of the hardware mark table (202) that the error has been rejected and is uncorrectable with the existing parameters. Rejecting (502) the error in the entry from the hardware mark table (202) may indicate that the particular memory location may not necessarily be the cause of the error, but rather the error may be interfering with the expected operation of the memory location. Rejecting (502) the error in the entry from the hardware mark table (202) may further indicate that the memory system is experiencing a widespread failure, and may need to be replaced.

Notifying (504) an issuer of the memory read operation that an uncorrectable error has occurred may be carried out by transmitting, from the memory logic (204), a signal detectable by the memory firmware (126) that indicates that the error is uncorrectable. The notification may include additional information about the error, such as the mark location and associated region (e.g., rank). The notification may further include an associated severity, and the notification that an uncorrectable error has occurred may include a high, or the highest, level of severity.

For example, a memory read operation may be executed targeting a memory location in rank C. During the execution of the memory read operation, the memory logic (204) determines that the data read does not match an expected data read for the memory location, and that an error has occurred. The memory logic (204) generates an entry in the hardware mark table (202) for rank C, indicates in the entry that an error has occurred, stores parameters for correcting the error in the entry, and marks the error as unconfirmed. The memory logic (204) then retries the memory read operation on the memory location within rank C, and determines that the same error has occurred. The memory logic (204) then determines that the error in rank C is not correctable, and rejects the error by notifying the memory firmware (126) that an uncorrectable error has occurred in rank C. The memory firmware (126) may then attempt to determine the extent of the error using a scrub engine, and if a significant portion of the computer memory is in danger of catastrophic failure, generate an alert for the operating system that a memory failure is likely.

Figure 6:
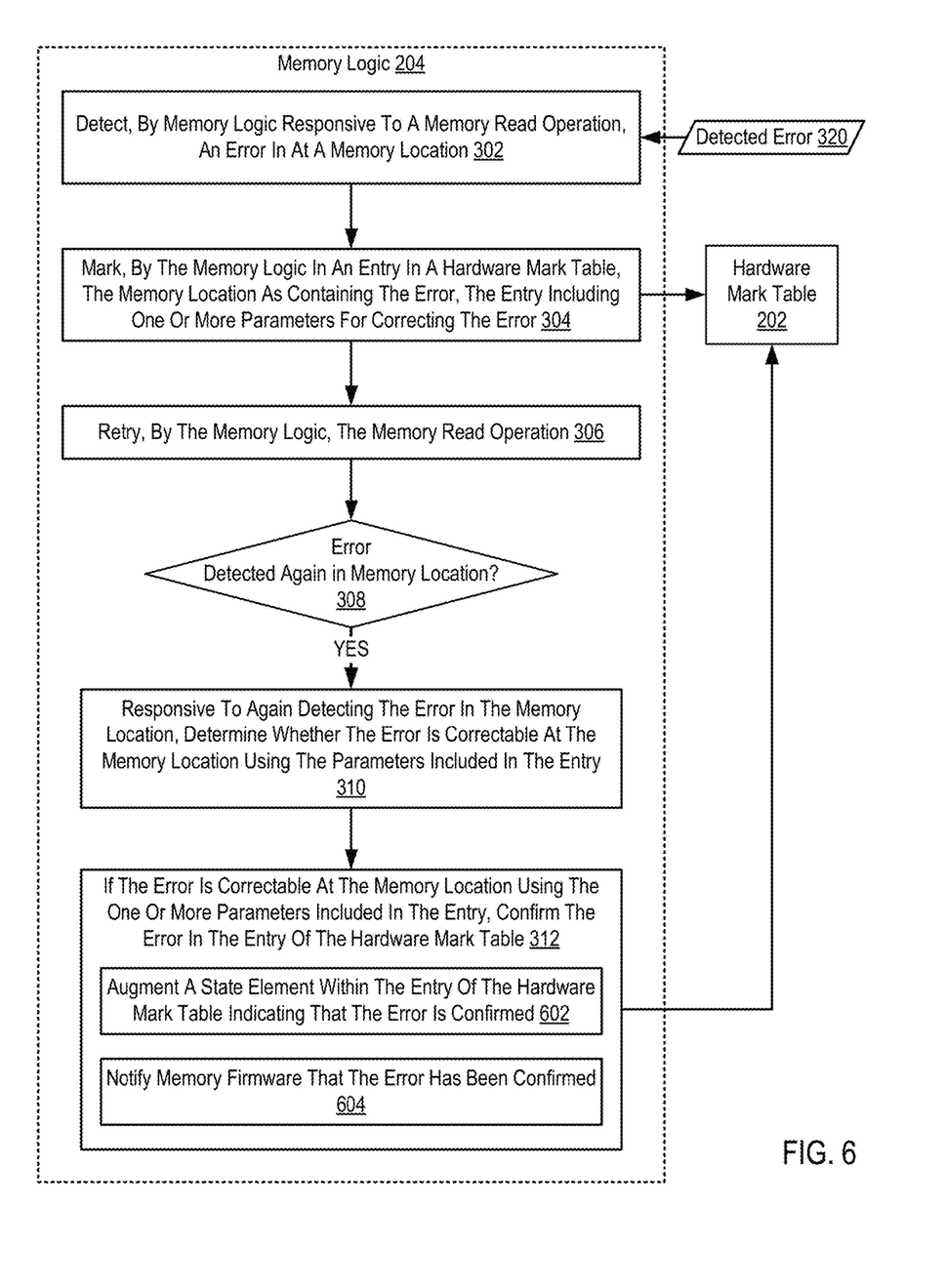
FIG. 6 sets forth a flow chart illustrating an exemplary method for confirming memory marks indicating an error in computer memory according to embodiments of the present invention.

For further explanation, FIG. 6 sets forth a flow chart illustrating an exemplary method for confirming memory marks indicating an error in computer memory according to embodiments of the present invention that includes detecting (302), by memory logic responsive to a memory read operation, an error (320) in at a memory location; marking (304), by the memory logic in an entry in a hardware mark table (202), the memory location as containing the error, the entry including one or more parameters for correcting the error; and retrying (306), by the memory logic, the memory read operation, including: determining (308) that the error has been detected again; responsive to again detecting the error in the memory location, determining (310) whether the error is correctable at the memory location using the parameters included in the entry; and if the error is correctable at the memory location using the one or more parameters included in the entry, confirming (312) the error in the entry of the hardware mark table (202).

The method of FIG. 5 differs from the method of FIG. 3, however, in that confirming (312) the error in the entry of the hardware mark table (202) includes augmenting (602) a state element within the entry of the hardware mark table (202) indicating that the error is confirmed; and notifying (604) memory firmware (126) that the error has been confirmed. Augmenting (602) a state element within the entry of the hardware mark table (202) indicating that the error is confirmed may be carried out by altering a state element (e.g., a bit) from one state (e.g., '0') to another (e.g., '1') indicating that the error has been confirmed.

Notifying (604) memory firmware (126) that the error has been confirmed may be carried out by transmitting, from the memory logic (204), a signal detectable by the memory firmware (126) that indicates that the error has been confirmed and is correctable. The notification may include additional information about the error, such as the mark location and associated region (e.g., rank).

For example, a memory read operation may be executed targeting a memory location in rank D. During the execution of the memory read operation, the memory logic (204) determines that the data read does not match an expected data read for the memory location, and that an error has occurred. The memory logic (204) generates an entry in the hardware mark table (202) for rank D, indicates in the entry that an error has occurred, stores parameters for correcting the error in the entry, and marks the error as unconfirmed. The memory logic (204) then retries the memory read operation on the memory location within rank D, and determines that the same error has occurred. The memory logic (204) then determines whether the error in rank D is correctable, and if so, corrects the error using the parameters stored in the entry. The memory logic (204) confirms the error by altering the confirmed element within the entry from '0' to '1' indicating that the error has been confirmed. Finally, the memory logic generates a notification to the memory firmware (126) that includes an indication that the error detected in rank D has been confirmed.

In view of the explanations set forth above, readers will recognize that the benefits of confirming memory marks indicating an error in computer memory according to embodiments of the present invention include:

Improving the operation of a computer system by adding functionality in the memory logic to confirm memory errors, increasing memory reliability and efficiency.

Improving the operation of a computer system by providing memory firmware with information about memory errors detected by the memory logic, increasing memory reliability and efficiency.

Improving the operation of a computer system by tracking comprehensive data about memory errors, increasing memory reliability and predictability.

Exemplary embodiments of the present invention are described largely in the context of a fully functional computer system for confirming memory marks indicating an error in computer memory. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of confirming memory marks indicating an error in computer memory, the method comprising:
   detecting, by memory logic responsive to a memory read operation, an error in a memory location;
   marking, by the memory logic in an entry in a hardware mark table, the memory location as containing the error, the entry including one or more parameters for correcting the error; and
   responsive to detecting the error in the memory location, retrying, by the memory logic, the memory read operation, including:
      responsive to again detecting the error in the memory location, determining whether the error is correctable at the memory location using the parameters included in the entry; and
      if the error is correctable at the memory location using the one or more parameters included in the entry, confirming the error in the entry of the hardware mark table.

2. The method of claim 1, wherein retrying, by the memory logic, the memory read operation further includes:
   removing the entry in the hardware mark table responsive to detecting no error in the memory location; and
   notifying memory firmware that the entry in the hardware mark table has been removed.

3. The method of claim 1, wherein retrying, by the memory logic, the memory read operation further includes:
   if the error is not correctable at the memory location using the parameters included in the entry, rejecting the error in the entry from the hardware mark table.

4. The method of claim 3, wherein rejecting the error in the entry from the hardware mark table comprises:
   notifying an issuer of the memory read operation that an uncorrectable error has occurred.

5. The method of claim 1, wherein confirming the error in the entry of the hardware mark table comprises:
   augmenting a state element within the entry of the hardware mark table indicating that the error is confirmed.

6. The method of claim 1, wherein the one or more parameters for correcting the error comprises one of a group consisting of a chip mark and a symbol mark.

7. The method of claim 1, wherein confirming the error in the entry of the hardware mark table comprises:
   notifying memory firmware that the error has been confirmed.

8. An apparatus for confirming memory marks indicating an error in computer memory, the apparatus configured to carry out the steps of:
   detecting, by memory logic responsive to a memory read operation, an error in a memory location;
   marking, by the memory logic in an entry in a hardware mark table, the memory location as containing the error, the entry including one or more parameters for correcting the error; and
   responsive to detecting the error in the memory location, retrying, by the memory logic, the memory read operation, including:
      responsive to again detecting the error in the memory location, determining whether the error is correctable at the memory location using the parameters included in the entry; and
      if the error is correctable at the memory location using the one or more parameters included in the entry, confirming the error in the entry of the hardware mark table.

9. The apparatus of claim 8, wherein retrying, by the memory logic, the memory read operation further includes:
   removing the entry in the hardware mark table responsive to detecting no error in the memory location; and
   notifying memory firmware that the entry in the hardware mark table has been removed.

10. The apparatus of claim 8, wherein retrying, by the memory logic, the memory read operation further includes:

if the error is not correctable at the memory location using the parameters included in the entry, rejecting the error in the entry from the hardware mark table.

11. The apparatus of claim 10, wherein rejecting the error in the entry from the hardware mark table comprises:
   notifying an issuer of the memory read operation that an uncorrectable error has occurred.

12. The apparatus of claim 8, wherein confirming the error in the entry of the hardware mark table comprises:
   augmenting a state element within the entry of the hardware mark table indicating that the error is confirmed.

13. The apparatus of claim 8, wherein the one or more parameters for correcting the error comprises one of a group consisting of a chip mark and a symbol mark.

14. The apparatus of claim 8, wherein confirming the error in the entry of the hardware mark table comprises:
   notifying memory firmware that the error has been confirmed.

15. A computer program product for confirming memory marks indicating an error in computer memory, the computer program product disposed upon a non-transitory computer readable medium, the computer program product configured to carry out the steps of:
   detecting, by memory logic responsive to a memory read operation, an error in a memory location;
   marking, by the memory logic in an entry in a hardware mark table, the memory location as containing the error, the entry including one or more parameters for correcting the error; and
   responsive to detecting the error in the memory location, retrying, by the memory logic, the memory read operation, including:
      responsive to again detecting the error in the memory location, determining whether the error is correctable at the memory location using the parameters included in the entry; and
      if the error is correctable at the memory location using the one or more parameters included in the entry, confirming the error in the entry of the hardware mark table.

16. The computer program product of claim 15, wherein retrying, by the memory logic, the memory read operation further includes:
   removing the entry in the hardware mark table responsive to detecting no error in the memory location; and
   notifying memory firmware that the entry in the hardware mark table has been removed.

17. The computer program product of claim 15, wherein retrying, by the memory logic, the memory read operation further includes:
   if the error is not correctable at the memory location using the parameters included in the entry, rejecting the error in the entry from the hardware mark table.

18. The computer program product of claim 17, wherein rejecting the error in the entry from the hardware mark table comprises:
   notifying an issuer of the memory read operation that an uncorrectable error has occurred.

19. The computer program product of claim 15, wherein confirming the error in the entry of the hardware mark table comprises:
   augmenting a state element within the entry of the hardware mark table indicating that the error is confirmed.

20. The computer program product of claim 15, wherein the one or more parameters for correcting the error comprises one of a group consisting of a chip mark and a symbol mark.

* * * * *